United States Patent [19]  
Freese

[11] 4,043,613  
[45] Aug. 23, 1977

[54] HYDROSTATIC BEARING
[75] Inventor: Lennart Werner Freese, Jarfalla, Sweden
[73] Assignee: New-Invent S.A., Geneva, Switzerland
[21] Appl. No.: 617,028
[22] Filed: Sept. 26, 1975
[30] Foreign Application Priority Data Oct. 4, 1974 Sweden .............................. 7412540

[51] Int. Cl.² ............................................. F16C 32/06
[52] U.S. Cl. ........................................ 308/9; 100/170
[58] Field of Search ................... 308/9, 35; 100/170
[56] References Cited
U.S. PATENT DOCUMENTS

| 3,785,708 | 1/1974 | Miyasaki | 308/9 |
| 3,806,208 | 4/1974 | Bruck | 308/9 |
| 3,934,947 | 1/1976 | Walter et al. | 308/9 |

Primary Examiner—Richard A. Bertsch  
Attorney, Agent, or Firm—Blanchard, Flynn, Thiel, Boutell & Tanis

[57] ABSTRACT

In a hydrostatic bearing there is provided in known manner pairs of balancing pockets between the coacting bearing surfaces. To counteract the bearing load the pockets of each pair is fed with pressure fluid through a new combined throttle valve which not only distributes the flow of pressure fluid but also its throttling or constricting effect between the pockets of the pair. The valve contains a freely movable roller element cooperating with two pairs of diametrically opposed ports in the valve housing, the ports of one pair individually communicating with each its pocket of the pair of pockets, the ports of the second pair communicating with a pressure source or pump and a low pressure outlet or sump, respectively.

11 Claims, 12 Drawing Figures

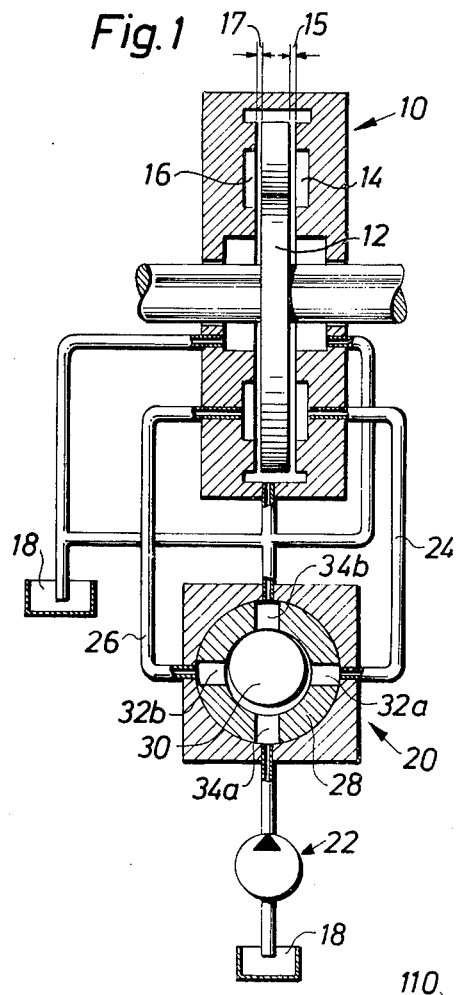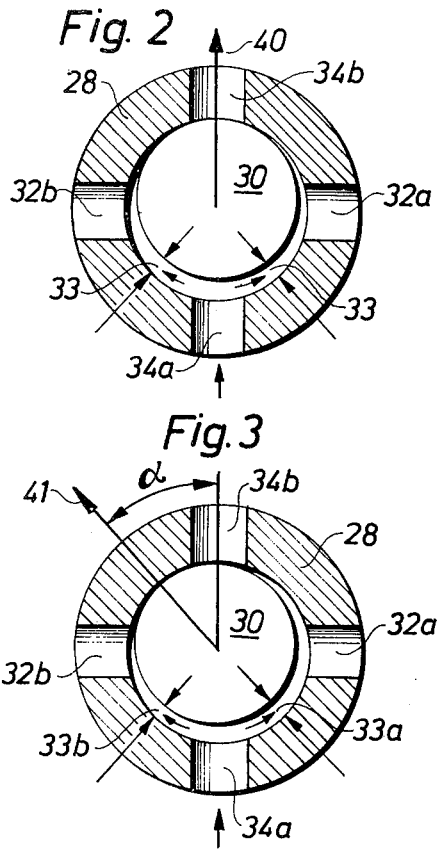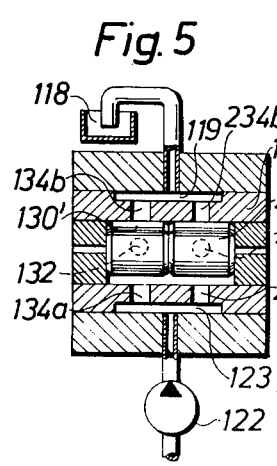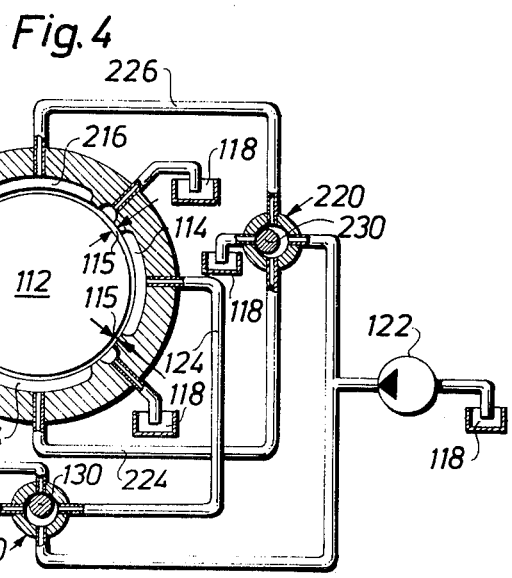

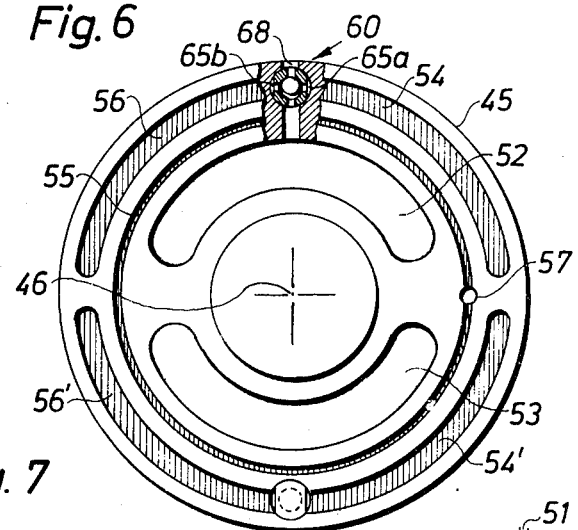
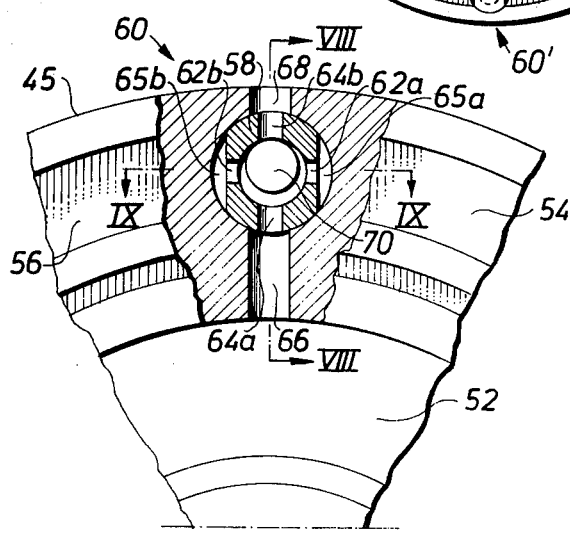
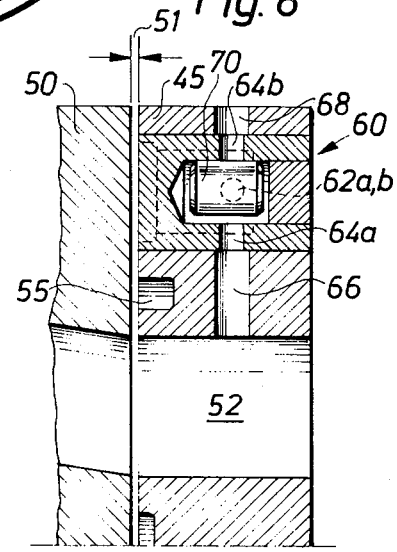
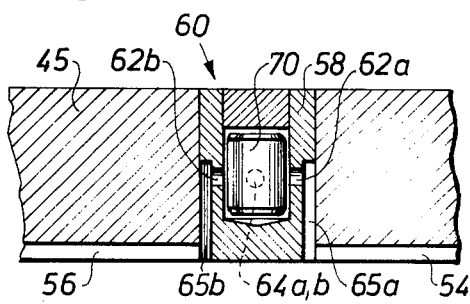
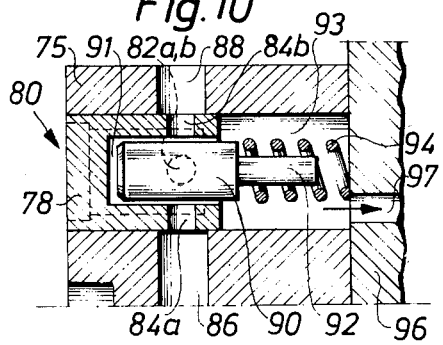

HYDROSTATIC BEARING

FIELD OF THE INVENTION

The present invention relates to hydrostatic bearings, i.e. such bearings where the load is taken up with low friction by a thin continuously flowing liquid film.

BACKGROUND OF THE INVENTION

Hydrostatic bearings are already known, and several proposals for practical, structural arragements have been put forward. However, all the hydrostatic bearing devices which so far have been used in practice have been found to have disadvantages of varying magnitude. According to the hydrostatic bearing principle, displacements arising in the bearing cause a rapid and strong reaction in the shape of counteracting hydrostatic pressure variations, and the bearing is said to be "stiffer", the more rapidly and strongly this reaction takes place in the bearing. It is desirable that such large stiffness is possessed by a hydrostatic bearing, as it can then work under large variable loads without the occurrence of any large displacements in the bearing or other disturbances in the bearing function.

The object of the invention is to provide a new improved hydrostatic bearing while using a new combined throttle valve which functions so as to distribute its throttling or constricting effect, and hereinafter referred to as a distributing throttle. The object is attained, and a sensitive hydrostatic bearing having large stiffness according to the above is provided, by the bearing according to this invention.

Some embodiments of the invention will now be described with a view to exemplification while referring to the attached drawings which schematically illustrate the invention.

BRIEF DESCRIPTION OF THE DRAWINGS

FIG. 1 shows how the invention is applied to a conventional axial bearing.

FIGS. 2 and 3 show schematic cross-sections of two different working positions of a distributing throttle valve incorporated in an arrangement according to FIG. 1.

FIG. 4 illustrates the application of the invention to a conventional radial bearing while using two distributing throttle valves of the same kind as the one used according to FIG. 1.

FIG. 5 shows how both distributing throttle valves according to FIG. 4 can be built together into a compact unit.

FIG. 6 ia a plan view of a valve plate incorporated in a hydaulic axial piston machine which is equipped with hydrostatic bearings according to the invention.

FIG. 7 shows an enlarged detail of FIG. 6, partly in section, to illustrate a distributing throttle valve inserted in the valve plate.

FIG. 8 is a section along the line VII—VII in FIG. 7.

FIG. 9 is a section along the line IX—IX in FIG. 7.

FIG. 10 shows a section corresponding to FIG. 8 through a portion of a valve plate in a hydraulic axial machine, provided with a modified distributing throttle valve.

DETAILED DESCRIPTION

Figure 11:
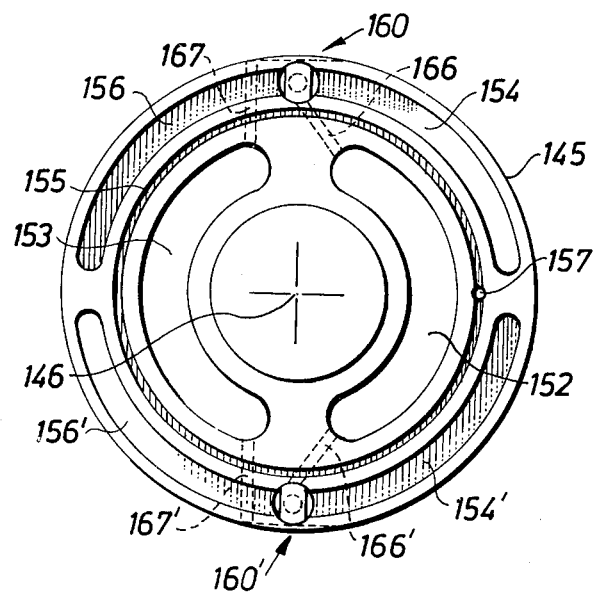
FIG. 11 is a plan view corresponding to FIG. 6 of a hydraulic axial piston machine, incorporating distribution throttle valves according to the invention, but with modified duct connections.

Schematically shown in FIG. 1 is a bearing device for taking up axial forces, wherein a shaft is rigidly united with a flange or disk 12 for taking up said axial forces, the disk being accomodated in an outer rigid bearing housing 10, with opposing circular or annular chambers 14 and 16, on either side of the disk 12. Between the latter and the housing 10 are formed gaps 15 and 17 constituting the communication means of the chambers 14 and 16 with the surroundings, or more closely the zero pressure area, which is in communication with a sump 18 by means of suitable lines, as shown by the figure. As may be seen, the disk 12 is so arranged in the housing that if it is displaced to the right, as viewed in FIG. 1, the gaps 15 are reduced while the gaps 17 are increased, and vice versa.

A distributing throttle valve 20 according to the invention is inserted between a pressure source 22, which may consist of a pump, and the bearing housing 10. From the throttle valve, a pressure line 24 goes to the chamber 14, and a pressure line 26 goes to the chamber 16. Pressure fluid thus flows to the respective chamber, exiting through the gaps 15 and 17 to the sump 18.

The distributing throttle valve 20 consists in principle of a valve bushing 28 with an inside cylindrical bore in which a valve element in the shape of a cylindrical body or roller 30 is accomodated with a certain amount of clearance. The bushing 28 is provided with two pairs of duct openings or ports 31a, 32b and 34a, 34b in the same plane, the ports in each pair being diametrically opposed on a centerline at right-angles to that of the other pair, as is clearly shown in the figure, which also shows that the line 24 is connected to the port 32a while the line 26 is connected to the port 32b. The port 34a is in communication with the pressure source or pump 22 while the opposing port 34b is in communication with the sump 18.

The mode of operation of the bearing device will now be described, starting from the case where the axial bearing is unloaded and thus the pressures in the chambers 14 and 16 are equal, the pressures in the ports 32a and 32b thereby also being equally great. The movable cylindrical valve element 30 is thus affected by equally opposing hydrostatic pressures from said ports. In a direction at right-angles hereto, i.e. vertically according to the figure, the element 30 is exposed meanwhile to the difference between the pressures prevailing in the ports 34a and 34b, i.e. in general the pressure of the pressure source 22. The valve element or roller 30 will thus take up the neutral position shown in FIG. 1, more closely illustrated in FIG. 2, whereby it is exposed to an upwardly directed resultant force 40. Because of the symmetrical position of the roller, the pressure fluid flowing from the pressure port 34a towards the ports 32a and 32b will meet equally as great gaps 33 exist between the roller 30 and the bushing 28; the flows are thus exposed to the same restriction and will thereby be equally as great. The disk 12 will thus assume an exactly central position in the bearing housing 10.

In the light of the given conditions it will be readily appreciated what occurs when the shaft with its disk 12 is exposed to an axial force, directed to the right in FIG. 1, for example. The gaps 15 are reduced while the gaps 17 are increased, and thus pressure in the chamber 14 rises, to exceed pressure in the chamber 16. This is immediately reflected at the ports 32a and 32b, the pressure increase in the former together with the pressure decrease in the latter exposing the roller 30 to a force direcred to the left, which means that the resultant force 41 now acting on the roller has been turned an angle α anti-clockwise in comparison with the previously acting force 40. In its turn, this causes (see Fig. 3) a leakage gap 33b to arise in the flow path between the ports 34a and 32b which is less then the corresponding gap 33a between the ports 34a and 32a. Flow to the chamber 16 is thus restricted more heavily than flow to the chamber 14, resulting in the rapid occurrence of a large counter-balancing force on the disk 12 and thereby on the shaft.

An illustrative comparison between the hydrostatic bearing device according to the invention and a conventional hydrostatic bearing may be carried out, if it is assumed that the roller 30 is fixed in its position shown in FIGS. 1 and 2. A conventional hydrostatic bearing having fixed restrictions is now formed, where the gaps 33 form fixed primay restrictions while the gaps 15 and 17 form the secondary restrictions of the bearing. In this case as well, an axial load on the disk 12, e.g. to the right in FIG. 1, causes the pressure to rise in the chamber 14 while it decreases in the chamber 16, which generates a counter-balancing force on the disk 12 accordng to the general principle of the hydrostatic bearing. But the reaction is slow, and the bearing will be less stiff compared with the reaction in the bearing according to the invention, where the primary restrictions are altered in the way described above so that building up of the correcting forces is hastened and amplified to a great degree, making the bearing extremely stiff.

In FIG. 4 there is illustrated how the hydrostatic bearing device according to the invention is applied to a radial bearing, more particularly to a bearing for a rotating shaft.

A shaft 112 is journalled in an outer housing 110. Between the shaft and the housing there are four equally distributed chambers or pockets 114, 116 and 214, 216. The pockets are commonly alike and are separated by ribs, in the latter there being axial grooves facing the shaft and extending parallel with the pockets, the grooves being in communication with the common sump 118 of the system. Leakage gaps are formed between the shaft and the ribs, and with respect to the chambers or pockets 114 and 116, for example, the pressure fluid in these pockets can leak out through the gaps 115 and 117 for return to the sump 118. By means of lines 124 and 126, respectively, the pockets 114 and 116 are in communication with a distributing throttle valve 120 conforming to the throttle valve 20 described above. The system is fed from a pressure source or pump 122. The throttle valve 120 thus receives pressure fluid from the pump 122, throttling and distributing the fluid via the lines 124 and 126 to the pockets 114 and 116, respectively. From the latter pockets the fluid returns to the sump 118 by means of the secondary restrictions or leakage gaps 115 and 117, in complete analogy with the flow from the pump 22, throttle valve 20, chambers 14 and 16 via the respective gaps 15 and 17 and back again to the sump 18 in the axial bearing according to FIG. 1. If the shaft 112 is thus displaced to the right in FIG. 4, the constriction of the gaps 115 and the corresponding dilation of the gaps 117 will cause a large pressure difference between the pockets 114 and 116, resulting in the valve element or roller 130 of the distributing throttle valve rolling to the left in the manner previously described. The shaft 112 is hereby promptly exposed to a large correcting force which strives to return the shaft to a position of balance between the pockets 114 and 116.

Both the remaining diametrically opposed pockets 214 and 216 are coupled into the system in exactly the same way, i.e. the pressure source 126 feeds a second distribution throttle valve 220 having a valve element 230, from which lines 224 and 226 take the pressure fluid to the respective pocket 214 and 216, thus providing counteracting hydrostatic forces in a vertical direction also. For the sake of simplicity the number of bearing pockets has been selected at four; it is naturaliy appreciated that the number of pairs of diametrically opposed pockets can be increased as desired.

It is to be noted with regard to both distributing throttle valves 120 and 220 that they do not need to be made separately but can to advantage be built together, for example, as is schematically indicated in FIG. 5. Both valve elements or rollers 130' and 230' are accomodated in a common valve housing in the shape of a bushing 128, in which both rollers lie coaxially side by side, each in cooperation with four ports (e.g. 134a, 134b; 134a, 132b), arranged in pairs and diametrically opposite each other at a pitch of 90°, as described above, the ports 134a and 234a carrying feeding pressure received from a common duct 123 in communication with the pump 122, while the respective opposing low pressure ports 134b and 234b, are in communication with the low pressure side or sump 118 via a common duct 119. The throttling openings 132 and 232 are at right angles to these ports, all arranged according to what has been described above. Both valve elements work completely independently of each other, and if the number of hydrostatic bearing pockets is greater than the sum of four (selected as an example) all the valve elements can be arranged in a common housing according to the principle shown in FIG. 5.

The distributing throttle valve according to the invention can also be used in such hydrostatic bearing devices where several forces coacting in pairs are involved, i.e. not only in bearings with opposing forces in pairs, as is described in conjunction with FIGS. 1–4. An example hereof is a single-acting hydrostatic axial bearing with the capacity of taking up a tipping moment, e.g. a bearing type utilized in hydraulic oil axial piston pumps and motors for balancing out the forces which the rotating drum of such a machine applies to the valve plate which is also incorporated. Some examples of such hydrostatic axial bearings will now be described.

In FIGS. 6–9 is shown a first embodiment of a hydrostatic axial bearing according to the above, the bearing being arranged to take up forces between a valve plate 45a and coacting rotating drum 50 (FIG. 8) in an axial piston machine, there being a gap 51 between these two elements. In a conventional manner the valve plate 45 is provided with two kidney-shaped or bean-shaped slits or ports 52 and 53, through which the working fluid is respectively taken to and from the cylinders (not shown) in the rotating drum 50, which is rotatably mounted about an axis 46 extending at right-angles to the valve plate and through the center thereof. The axial raction forces from the pistons which act on the rotating drum 50 and urge this on to the valve plate 45 are counter-balanced when the machine is pressuirzed, partly by the pressure in the ports 52, 53, and partly by pressure in the hydrostatic bearing pockets 54, 56 and 54', 56'. Between these bearing pockets and the ports 52, 53 extends a draining groove 55, communicating with the low pressure side of the machine through a duct 57.

As may be seen from FIG. 6, a distributing throttle valve 60 and 60' is respectively arranged between the bearing pockets in each pair of pockets 54, 56 and 54', 56', the pressure fluid being taken to the pockets in each pair via the respective valve from the associated port 52, 53 through radial ducts 66. These take the pressue fluid to the respective distributing throttle valve which is then in communication with the associated bearing pockets by means of axial grooves or segmental ducts 65b and 65a, see especially FIG. 9.

Both the distributing throttle valve 60 and 60' are mutually identical and are built up in identically the same way as the previous ones described in conjunction with FIGS. 1–5. Considering now the throttle valve 60, from FIGS. 7–9 it can be seen that the throttle comprises a valve bushing 58 with a central bore, in which a cylindrical valve body or roller 70 is accomodated with a certain clearance. As before, four ports arranged in pairs and diametrically opposite each other are accomodate in the bushing 58 for opening out into the chamber accomodating the bushing roller 70. Port 64a is in communication with the machine port 52 via the duct 66, while port 64b is in communciation via an outlet duct 68 with the machine outflow or to a space draining to a tank. Port 62a is in communication with the bearing pocket 54 via the segmental duct 65a (see FIG. 9) while port 62b is in communication with the bearing pocket 56 via the segmental duct 65b.

The pessure in the bearing pockets 54, 56 and 54', 56' is determined by the forces with which the rotating drum 50 is urged against the valve plate 45 at a certain moment, and the gap 51 between these elements will be determined inter alia by the diametral clearance between the valve element or roller 70 lying in the chamber of the bushing 58 and the chamber itself. For an unsymmetrical loading on the rotating drum, i.e. the axial resultant force lying for example on the left of a central plane through both the distributing throttle valves 60 and 60', the gap 51 tends to diminish on the heaviest loaded side of the valve plate (to the left in FIG. 6) and analogously to increase on the less loaded side to the right. Consequent hereto, pressure will be different in the bearing pockets (highest in the pocket 56, if it is assumed that the port 52 is the high pressure port) simultaneously causing the valve element 70 to alter its position, i.e. it rolls over to the right in FIG. 7 as has been previously described. The degree of constriction in the ingress path past the valve element to the respective bearing pocket is hereby varied in such a way that the said oblique position of the rotating drum is strongly counteracted. The distributing throttle valve according to the invention thus also contributes in this case to keeping the gap 51 between the drum 50 and valve plate 45 as constant as possible, which is desirable, bearing in mind the leakage losses from the ports 52, 53, occurring between the sealing faces bounding them.

Implementation of the distributing throttle valves can advantageously be carried out as schematically illustrated in FIG. 10, whereby the valve element or roller of the respective throttle value is exposed to an axial movement or "cleaning movement", controlled by the pressure without affecting the constriction distributing function of the valve.

The distributing throttle valve 80 shown in FIG. 10 comprises, as before, a valve bushing 78 inserted for example into a valve plate 75 similar to the valve plate 45 described above. In a bore in the bushing 78 there is accomodated a valve element in the form of a cylindrical body or roller 90 for co-action with the ports 82, 84 in the bushing. Of the ports, 82a and 82b are each in communication with a bearing pocket as above, while 84a is in communication with the pressure inlet 86, and 84b is in communication with a duct 88 to the machine outflow or low pressure side. At one end, the roller 90 is provided with a small locating pin 92 for a light spring 94, which abuts a wall 96 (not more closely shown) incorporated in the machine housing or machine structure, the spring being biased to thrust the valve body 90 to the left in FIG. 10. The righthand portion of the valve element 90, with the locating pin 92 and spring 94, are in the righthand portion 93 of the cylindrical bore in the valve plate 75 accomodating the valve bushing 78, and this space is in communication with the low pressure side of the bushing 78, and this space is in communication with the low pressure side of the machine by means of a duct 97 in the wall 96.

At zero pressure in the pressure supply duct 86 (and thereby in the entire valve) the element 90 is thrust to the left in FIG. 10 by the spring 94, but if pressure is supplied through the duct 86 and the port 84a, this is propagated while being throttled through the gap between the valve body 90 and the surrounding wall in the bushing 78 to the space 91 at the left of the element, whereby this is thrust somewhat to the right, against the bias of the spring 94 since the pressure in the space 93 on the right of the element 90 is evened out through the draining duct 97. According as to how the pressure varies, the valve element is thrust backwards and forwards without, as has been pointed out above, its throttling distribution function being affected in the least, but to a large extent this axial movement contributes to reducing the risk of the distributing throttle being plugged up by foreign matter.

The system described above with two distributing throttles value 60 and 60' coacting with the inlet and outlet ports 52 and 53 respectively of a hydraulic axial piston machine demonstrates the limitation that hydraulic counteraction is only excercised by the balancing pockets which are in communication via a coacting distributing throttle valve with that of the ports 52 or 53 which is under pressure, said pressue being determined by the direction of rotation of the machine and whether it is working as a pump or motor. The limitation remains even if more distributing throttle valves are introduced to give the balancing pockets a shorter peripheral extension.

Figure 12:
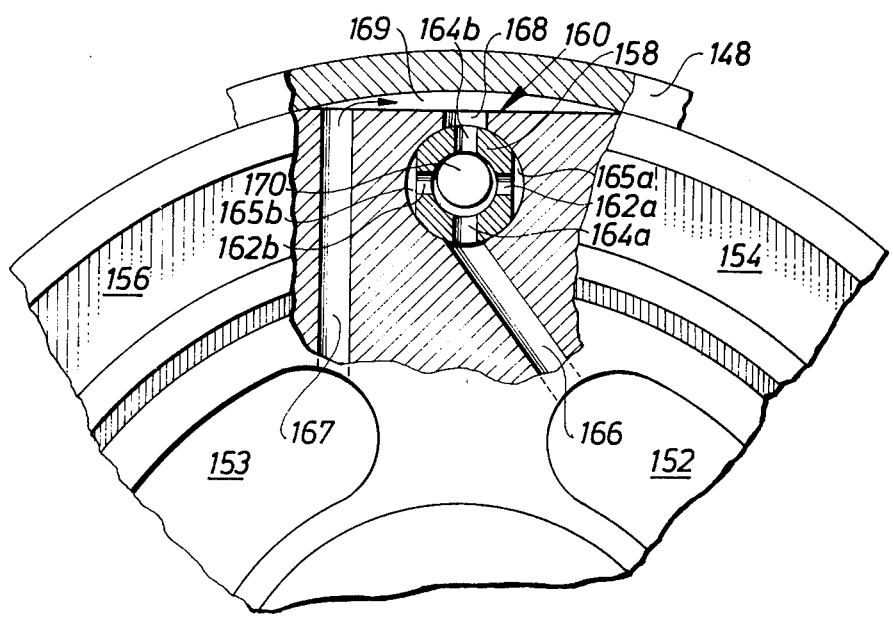
FIG. 12 shows, partly in section, an enlarged detail of the valve plate according to FIG. 11, for illustrating the modified duct connections to the throttle valves.

In FIGS. 11 and 12 there is schematically illustrated how the said disadvantage can be remedied in a simple manner by the natural symmetry of the distributing throttle valve according to the invention being utilized so that it becomes "double-acting", as will be shortly explained.

Consider, as before, the valve plate 145 of an axial machine having inlet and outlet ports 152 and 153 respectively. To retain the analogy between the arrangement of the previously described distributing throttle valves 60, 60' and the corresponding valves described in the following, the ports 152 and 153 are shown turned through 90° in relation to the ports 52 and 53 according to FIG. 6. The hydraulic machine as such is assumed for the remainder to the exactly the same as the hydrostatically counter-balanced machine according to FIGS. 6–8. As previously, pairs of coacting balancing pockets 154, 156 and 154', 156' extend along the periphery of the valve plate, the pockets 154 and 156 being joined via a distributing throttle valve 160, while a like diametrically opposed valve 160' hydraulically unites the opposite pair of balancing pockets 154' and 156'. As before, a draining groove 155 extends peripherally between the balancing pockets and the ports 152, 153, the draining groove being in communication with the low pressure side of the machine by means of an outflow duct 157.

Both distributing throttle valves 160 and 160' are identically alike, and therefore only one will be described in more detail while referring to FIG. 12. The throttle valve per se agrees completely with the previously described throttle valve 60 and thus includes a valve bushing 158, the interior bore of which accomodates a cylindrical valve element or roller 170 for coaction with two pairs of diametrically opposed ports 162a, 162b and 164a, 164b. The port 162a is in communication via a segmental canal 165a with the balancing pocket 154 while the port 162b is in communication via a segmental canal 165b with the balancing pocket 156.

Of the remaining ports, 164a is in communication by means of a duct 166 with one of the machine ports, namely 152, but in contradistinction to the previously described arrangements, the opposing port 164b is in communication with the other port 153, the connection being schematically shown by a duct 167 extending at a suitable depth generally radially through the valve plate 145 towards the periphery or curved surface of the latter, where a milled flat forms a space or segmental duct 169 between the valve plate and surrounding housing, of which a portion is indicated at 148. From the said segmental duct, a radial duct 168 is arranged for communication with the port 164b, the latter thus being in communication with the machine port 153 via said duct 168, the space 169 and the duct 167. As may be seen from FIG. 11, the diametrically opposed distributing throttle valve 160' is connected to the ports 152 and 153 in a corresponding manner through the ports 166' and 167' respectively. Through this arrangement, both throttle valves 160 and 160' will, in accordance with the principles of the invention, continuously distribute the pressure between the bearing pockets 154, 156 and between pockets 154' and 156', irrespective of whether port 152 or 153 is carrying pressure.

If it assumed that high pressure is prevailing in the port 152, this is propagated through the ducts 166 and 166' to the distributing throttle valves 160 and 160', respectively, and is distributed between the pairs of bearing pockets 154, 156 and 154', 156', respectively. If an exterior pressure resultant occurs, for example to the right of a central plane through the throttle valves 160, 160', the pressure thus rises immediately in the pockets 154, 154', which according to the principle of the invention causes the valve element 170, 170', to roll somewhat over to the left, and as a result of the altered constriction the pressures in all the pockets will immediately adjust themselves to counteract the exterior load in a manner described above. It will now be easily appreciated that nothing is altered in the function of the valves if the machine ports 152 and 153 exchange roles, i.e. so that high pressure prevails in the port 153. If the throttle valve 160 is now considered, for example, this pressure is conveyed through the duct 167, the space 169, the duct 168 and the port 164b to the interior of the distributing throttle valve 160, the port 164b of which will thus become the high pressure port while the opposing port 164a in communication with the port 152 will be the low pressure port. Exactly the same conditions prevail at the opposing distributing throttle valve 160'. Each valve thus carries out its constriction distributing effect irrespective of which of the ports 152 and 153 is carrying high pressure.

From the above examples of the hydrostatic bearing device according to the invention it should be apparent that the device forms a sensitive, quickly reacting counter-balancing system with a simple and robust construction. It should be particularly noticed that both primary and secondary constrictions which take place are developed between mutually movable surfaces, the constrictions per se therefore being self-cleaning to a certain extent, this being an effect which can be further amplified, as was described in reference to FIG. 10.

Neither is the invention limited to the embodiments shown as examples, but can be the subject of further design variations while applying the fundamental idea, and without the scope of the invention being exceeded.

I claim:

1. A hydrostatic bearing having at least one pair of bearing pockets formed between the coacting surfaces of the bearing and which are supplied with pressure fluid from a pressure source to develop a counteracting pressure to the bearing load in a manner known per se, wherein the bearing pockets are supplied with pressure fluid through a valve means for throttling and distributing the fluid, the valve means being adapted to distribute, under constriction, the pressure fluid from the pressure source between the pockets in such a way that the valve means (1) reduces its throttling effect on the flow to a pocket if the pressure caused by the bearing load in this pocket rises and (2) increases its throttling effect on the flow to a pocket if the pressure caused by the bearing load in this pocket decreases, comprising the improvement wherein the valve means includes a valve element in the shape of a cylindrical body or roller which is accomodated freely movable in a cylindrical valve chamber, the diameter of which somewhat exceeds that of the element, so that a clearance or gap is formed between the element and the chamber wall, in which the chamber has a set of four openings for coacting with the valve element, which is arranged to cover the openings to a varying degree with its curved surface, two opposing openings forming bearing ports each in communication with a bearing pocket while the two remaining openings form a pressure port and an outflow port respectively in communication with the pressure source and a low pressure area such as an outflow or a sump, so that the pressure fluid from the pressure port is distributed on either side of the valve element to the bearing ports through the gaps between the element and the chamber wall, which gaps are varied by the movement of the element, and thus the degree of constriction of the fluid as well as the pressure medium itself being distributed between the pockets.

2. A hydrostatic bearing as claimed in claim 1, wherein the four ports are equally distributed along the circumference of the chamber with their central points in a common plane at right angles to the longitudinal axis of the chamber.

3. A hydrostatic bearing as claimed in claim 1, wherein the valve chamber contains a plurality of said valve elements arranged coaxially side by side, each said valve element coacting with a set of said ports.

4. A hydrostatic bearing as claimed in claim 1, wherein the valve chamber is closed at one end so that a space if formed between the closed end or bottom of the chamber and the adjacent end of the valve element, said space being in communication with the ports through the gap between the valve element and the chamber wall, while the opposite end of the chamber is in communication with a low pressure area, a spring means being arranged to bias the valve element in an axial direction towards the closed end of the chamber against the pressure prevailing in said space according as to how the pressure varies at the said gap, so that the valve element is also exposed to an axial movement with a cleaning action besides its radial movement for flow and constriction distribution.

5. A hydrostatic bearing having at least one pair of bearing pockets formed between the coacting surfaces of the bearing and which are supplied with pressure fluid from a pressure source to develop a counteracting pressure to the bearing load in a manner known per se, wherein the bearing pockets are supplied with pressure fluid through a valve means for throttling and distributing the fluid, the valve means being adapted to distribute, under constriction, the pressure fluid from the pressure source between the pockets in such a way that the valve means (1) reduces its throttling effect on the flow to a pocket if the pressure caused by the bearing load in this pocket rises and (2) increases its throttling effect on the flow to a pocket if the pressure caused by the bearing load in this pocket decreases, comprising the improvement wherein the bearing is in the form of a double-acting axial bearing comprising a bearing means having radial bearing surfaces, and wherein the bearing means is arranged to coact with a least said pair of bearing pockets, said pockets being disposed in opposing relationship.

6. A hydrostatic bearing having at least one pair of bearing pockets formed between the coacting surfaces of the bearing and which are supplied with pressure fluid from a pressure source to develop a counteracting pressure to the bearing load in a manner known per se, wherein the bearing pockets are supplied with pressure fluid through a valve means for throttling and distributing the fluid, the valve means being adapted to distribute, under constriction, the pressure fluid from the pressure source between the pockets in such a way that the valve means (1) reduces its throttling effect on the flow to a pocket if the pressure caused by the bearing load in this pocket rises and (2) increases its throttling effect on the flow to a pocket if the pressure caused by the bearing load in this pocket decreases, comprising the improvement wherein the bearing is in the form of a radial bearing means comprising shaft means having axial bearing surfaces, and wherein the shaft means is arranged for coaction with said pair of bearing pockets, said pockets being disposed in opposing relationship.

7. A hydrostatic bearing having at least one pair of bearing pockets formed between the coacting surfaces of the bearing and which are supplied with pressure fluid from a pressure source to develop a counteracting pressure to the bearing load in a manner known per se, wherein the bearing pockets are supplied with pressure fluid through a valve means for throttling and distributing the fluid, the valve means being adapted to distribute, under constriction, the pressure fluid from the pressure source between the pockets in such a way that the valve means (1) reduces its throttling effect on the flow to a pocket if the pressure cuased by the bearing load in this pocket rises and (2) increases its throttling effect on the flow to a pocket if the pressure caused by the bearing load in this pocket decreases, comprising the improvement wherein said bearing is in the form of a single-acting axial bearing for taking up a tipping moment and includes a first bearing means with a radial bearing surface, the bearing means being arranged to coact with at least two said bearing pockets distributed peripherally in an opposing second bearing means, said bearing pockets each being connected to said valve means.

8. A hydrostatic bearing as claimed in claim 8 for use in a hydraulic axial piston machine, whereat the first bearing means comprises the rotating cylinder drum of the machine and the opposing second bearing means comprises the valve plate which is provided with valve ports, wherein the valve plate is provided with two pairs of said bearing pockets therein, and wherein said valve means includes at least two distributing throttle valves each having two bearing ports which are individually each in communication with one of said bearing pockets.

9. A hydrostatic bearing as claimed in claim 8, wherein one distributing throttle valve has a pressure support port which is in communication with one of the valve ports of the valve plate, wherein the other distributing throttle valve has a pressure supply port which is in communication with the second valve port of the valve plate, and wherein the outflow ports of both valves ae in communication with a sump or a low pressure area.

10. A hydrostatic bearing as claimed in claim 8, wherein a pressure port of each distributing throttle valve is in communication with the high pressure valve port of the valve plate while an outflow port of each valve is in communication with the unpressurized or low pressure valve port of the valve plate, the pressure and outflow ports of the distributing throttle valves being caused to change function if the valve ports of the valve plate change functions, i.e. if the high pressure port becomes the low pressure one and the low pressure port becomes the high pressure one.

11. A distributing throttle valve for hydrostatic bearings of the kind having one or more pairs of bearing pockets formed between the coacting surfaces of the bearing and which are supplied with pressure fluid from a pressure source to develop in the pockets a counteracting pressure to the bearing load in a manner known per se, each pair of bearing pockets being supplied with pressure fluid through one distributing throttle valve, which thus is adapted to distribute, under constriction, the pressure medium from the pressure source between the pockets of the pair in such a way that the valve reduces its throttling effect on the flow to one of the pockets if the pressure caused by the bearing load in this pocket raises while it increases its throttling effect on the flow to the other pocket, comprising the improvement wherein the distributing throttle valve includes a valve element in the shape of a cylindrical body or roller which is accomodated freely movable in a cylindrical valve chamber, the diameter of which somewhat exceeds that of the element, so that a clearance or gap is formed between the element and the chamber wall, said chamber having two pairs of opposing openings forming a ring about the valve element for coacting with said valve element, which valve element is arranged to cover the openings to a varying degree with its curved surface, the one pair of opposing openings forming bearings ports each in communication with a bearing pocket while the other pair of opposing openings form a pressure port and an outflow port respectively in communication with the pressure source and a low pressure area.

* * * * *